(12) United States Patent
Jayaram et al.

(10) Patent No.: US 7,670,010 B2
(45) Date of Patent: Mar. 2, 2010

(54) SYSTEM AND METHOD FOR PROJECTOR LAMP SAFETY INTERLOCK

(75) Inventors: Subramanian Jayaram, Austin, TX (US); Samuel Nicklaus D'Alessio, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 731 days.

(21) Appl. No.: 11/533,872

(22) Filed: Sep. 21, 2006

(65) Prior Publication Data

US 2008/0074622 A1 Mar. 27, 2008

(51) Int. Cl.
*G03B 21/20* (2006.01)
*G03B 21/22* (2006.01)
*G03B 21/14* (2006.01)

(52) U.S. Cl. ......................... 353/85; 353/119
(58) Field of Classification Search ............... 353/85, 353/87, 119, 122; 439/232–233, 236, 310, 439/911; 307/328; 361/1, 18, 615–616
See application file for complete search history.

(56) References Cited

U.S. PATENT DOCUMENTS

| | | | |
|---|---|---|---|
| 5,241,242 A | 8/1993 | Daub | |
| 5,855,488 A | 1/1999 | Heintz et al. | |
| 6,402,346 B1 * | 6/2002 | Liao et al. | 362/294 |
| 6,424,097 B1 | 7/2002 | Pruett et al. | 315/219 |
| 6,802,615 B2 * | 10/2004 | Okada | 353/85 |
| 6,853,152 B2 | 2/2005 | Pruett et al. | 315/219 |
| 7,175,288 B2 * | 2/2007 | Wu | 353/98 |
| 2001/0038520 A1 * | 11/2001 | Yagi | 361/246 |
| 2002/0168287 A1 * | 11/2002 | Eckhardt et al. | 422/24 |
| 2004/0057019 A1 * | 3/2004 | Sokolov | 353/31 |
| 2007/0075647 A1 * | 4/2007 | Tsintzouras et al. | 315/119 |

FOREIGN PATENT DOCUMENTS

EP 1770431 A1 4/2007

* cited by examiner

*Primary Examiner*—Georgia Y Epps
*Assistant Examiner*—Jori S Byrne-Diakun
(74) *Attorney, Agent, or Firm*—Hamilton & Terrile, LLP; Robert W. Holland

(57) ABSTRACT

An information handling system projector lamp housing includes a safety interlock to reduce the risk of electrical shock to an end user during lamp insertion and removal. A ballast disposed in the projector interfaces with a low voltage power supply through a ballast power supply circuit and transforms the low voltage into high voltage for use by the lamp. A connector associated with the ballast connects with a connector on the lamp housing to supply the high voltage to the lamp. The safety interlock breaks the ballast power supply circuit if the ballast connectors are exposed, such as during insertion or removal of the lamp. The safety interlock completes the ballast power supply circuit as the lamp housing fully inserts in the projector to allow power supply for illumination of the lamp.

12 Claims, 2 Drawing Sheets

SYSTEM AND METHOD FOR PROJECTOR LAMP SAFETY INTERLOCK

BACKGROUND OF THE INVENTION

1. Field of the Invention

The present invention relates in general to the field of information handling system projector displays, and more particularly to a system and method for a projector lamp safety interlock.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically present visual images through a peripheral display device. With information handling systems finding increasing use as entertainment tools, such as for watching movies or playing games, high quality display presentations have become of greater interest to end users. Display devices with relatively high resolution are generally able present larger images while maintaining good visual quality. One example of a high resolution display that presents a high quality image is the projector. Projectors receive visual information from information handling systems through standardized interfaces, such as through a DVI or VGA cable, and generate images with an internal transparent device, such as a liquid crystal display. A high intensity light is passed through the transparent device and focused at a point distal from the projector to present the image. For example, high pressure mercury lamps are often used in projectors to provide an intense and bright light source to illuminate the visual image. Projector lamps are periodically replaced as their brightness intensity diminishes with use. For example, the lamp is integrated in a housing sized to fit into a cavity of the projector so that lamps are changed by releasing an existing housing and inserting a new housing.

One difficulty with projectors is that the mercury lamps typically needed to get a quality visual presentation operate at high voltage levels. The voltage levels are generated with ballast electronics that connect to the lamp through the lamp housing. These high voltage levels present a hazard to end users when a lamp housing is changed if the end user forgets to disconnect power to the projector before changing the lamp. Some projectors include a safety mechanism that turns off power to the lamp ballast electronics if a projector housing door that encloses the lamp is opened. For example, a switch connected to the projector housing door deactivates power to the ballast if the projector housing door opens to expose the lamp. However, such safety systems can make a projector unusable in the event of damage to the projector housing door or to the safety switch. Over time, physical devices having moving parts are more apt to fail than electronic devices without moving parts. Further, the projector has to include wiring and programming to apply switch activation to the ballast power, all of which are subject to failure.

SUMMARY OF THE INVENTION

Therefore a need has arisen for a system and method which provides a safety interlock to remove power to a projector lamp ballast during replacement of the projector lamp.

In accordance with the present invention, a system and method are provided which substantially reduce the disadvantages and problems associated with previous methods and systems for removing power to a projector lamp ballast during projector lamp changes. A safety interlock breaks a ballast supply circuit unless ballast connectors that provide high voltage power to a projector lamp are not exposed or otherwise presenting a shock hazard.

More specifically, an information handling system has plural processing components to generate visual information for presentation as visual images by a display device, such as a projector. The visual information is communicated to processing components of a projector, which generates a visual image at a device, such as an LCD, disposed between a lamp and a lens. The projector lamp illuminates the image with high intensity light to project the image through the lens to a display surface, such as with a metal hydride lamp that operates with high voltage provided by a lamp ballast. A safety interlock disposed in a ballast power supply circuit breaks the circuit unless the lamp is sufficiently inserted into the projector to prevent exposure of the ballast and lamp high voltage connectors. On installation of the lamp into the projector, the safety interlock completes the circuit when the lamp is inserted a predetermined distance sufficient to prevent exposure of the high voltage ballast connectors. On removal of the lamp from the projector, once the lamp is removed the predetermined distance, e.g., before exposure of the ballast connectors, power is removed from the ballast so that further withdrawal of the lamp from the projector will not expose "hot" ballast connectors.

The present invention provides a number of important technical advantages. One example of an important technical advantage is that power is automatically removed from a projector lamp ballast during change of the projector lamp. Removal of the lamp housing automatically removes ballast power before the lamp ballast connector is exposed, thus removing the risk of an electrical shock. The interlock that remove ballast power has no moving parts and is integrated in the lamp housing for replacement each time the lamp is replaced. Since the interlock directly connects and disconnects power to the lamp ballast, safety from electrical shock is ensured without additional wiring or programming to minimize potential points of failure.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Restricting power application to a projector ballast until a projector lamp is installed improves safety for operating an information handling system to present visual information by reducing risk of electrical shock. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
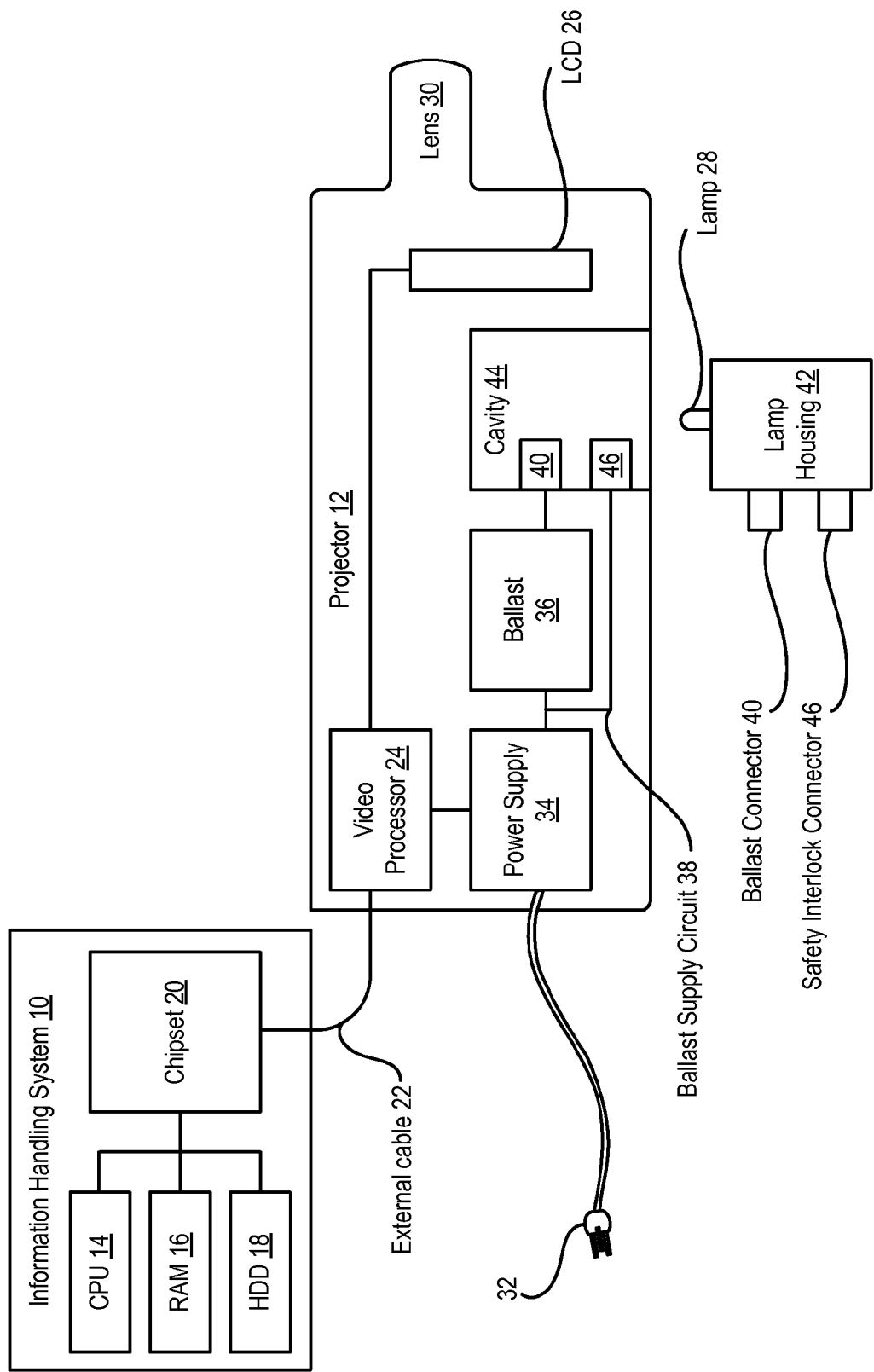
FIG. 1 depicts a block diagram of an information handling system and projector operable to present visual information as visual images.

Referring now to FIG. 1, a block diagram depicts an information handling system 10 and projector 12 operable to present visual information as visual images. Information handling system 10 generates visual information with a plurality of processing components, such as CPU 14, RAM 16, a hard disk drive 18, and a chipset 20. For instance, CPU 14 runs an application stored on hard disk drive 18 that generates visual information using RAM 16 and chipset 20. Chipset 20 includes graphics components that format the visual information for presentation by a display and communicates the formatted visual information to projector 12 through an external cable 22, such as DVI cable. Projector 12 includes a video processor 24 that applies the visual information to set pixel values in an LCD 26 so that a visual image is created corresponding to the visual information. The visual image is presented at a distal surface by focusing light from a lamp 28 through a lens 30.

In order to present a clear visual image, a lamp 28 is selected that provides powerful illumination, such as a metal hydride lamp. To initiate and maintain illumination from lamp 28, a high alternating current (AC) voltage is required, such as 25,000 volts. An external AC power source 32 is provided to a power supply 34 to generate a direct current (DC) voltage for operating components of projector 12. The DC voltage is provided to a ballast 36 through a ballast supply circuit 38 for generation of AC voltage to operate lamp 28. The ballast voltage is communicated through ballast connectors 40 that connect when a lamp housing 42 containing lamp 28 is inserted into a lamp housing cavity 44 formed in projector 12. To prevent application of power from ballast 36 when ballast connectors 40 are exposed, safety interlock connectors 46 break ballast supply circuit 38 until lamp housing 42 is sufficiently inserted to avoid exposure of ballast connectors 40. Lamp housing 42 is formed so that insertion into cavity 44 is prevented unless ballast connectors 40 and safety interlock connectors 46 are aligned, such as by having opposing grooves formed in opposing sides of cavity 44 and lamp housing 42.

Figure 2:
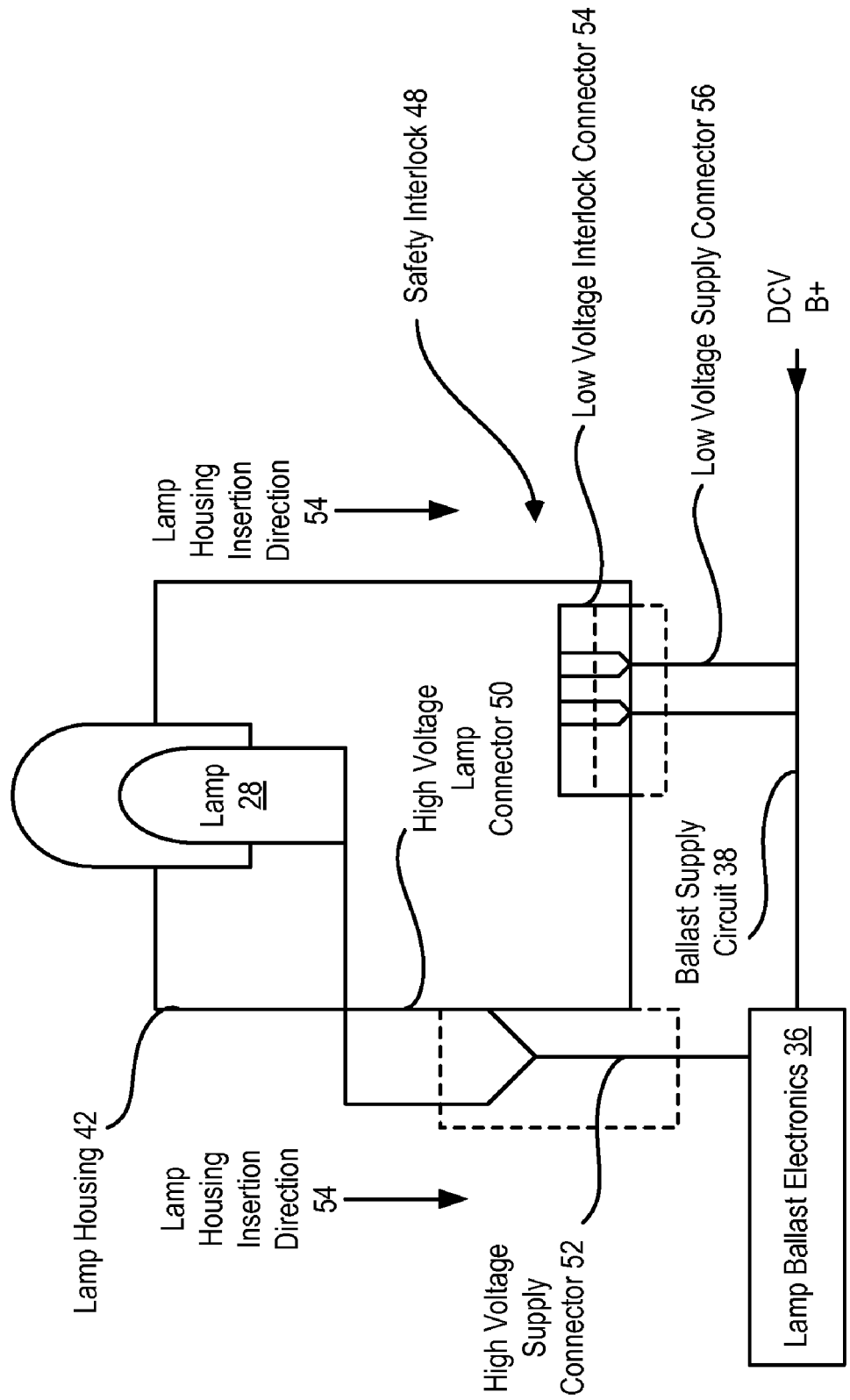
FIG. 2 depicts a block diagram of a projector lamp safety interlock system.

Referring now to FIG. 2, a block diagram depicts a projector lamp safety interlock system 48. Lamp housing 42 contains lamp 28 and a high voltage lamp connector 50 aligned to connect with a high voltage supply connector 52 when lamp housing 42 is inserted into a projector along an insertion axis 54. Connectors 50 and 52 engage during insertion so that high voltage provided from ballast 36 is not exposed once lamp housing 42 is inserted a predetermined distance, as illustrated by the dotted lines. Safety interlock 48 has opposing low voltage interlock connector 54 and low voltage supply connector 56 aligned to complete ballast supply circuit 38 as lamp housing 42 is fully inserted into a projector. During insertion of lamp housing 42, safety interlock 48 does not complete ballast supply circuit 38 until connectors 50 and 52 are sufficiently coupled to prevent exposure of high voltage provided by ballast 36. During removal of lamp housing 42, safety interlock 48 breaks ballast supply circuit 38 before lamp housing 42 moves a predetermined distance at which ballast connectors 50 and 52 are exposed. After safety interlock 48 breaks ballast supply circuit 38, power is removed from ballast 36 to remove the risk of electrical shock before ballast connectors 50 and 52 are exposed.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to generate visual information for presentation at a projector;
   a projector interfaced with the processing components and operable to present the visual information, the projector having a housing, a lamp disposed in the housing, a ballast operable to provide operating voltage for the lamp, and a power source interfaced with ballast and operable to provide power to the ballast;
   a ballast plug having a first connector associated with the lamp and a second connector associated with the ballast; and
   a safety interlock having a first connector associated with the lamp and a second connector associated with the projector housing, the safety interlock disposed between the power source and the ballast;
   wherein withdrawal of the lamp from the housing disengages the safety interlock before disengagement of the ballast plug to remove power to the ballast before exposure of the ballast connectors.

2. The information handling system of claim 1 further comprising a lamp housing containing the lamp, the ballast plug first connector and the safety interlock first connector disposed on an outer surface of the lamp housing.

3. The information handling system of claim 2 wherein the projector housing has a cavity sized to accept the lamp housing along an insertion axis so that the ballast plug connectors and the safety interlock connectors align.

4. The information handling system of claim 3 wherein the lamp comprises a metal halogen lamp.

5. A method for managing power application to a projector lamp, the method comprising:
   disposing a ballast connector in a projector;
   disposing an interlock connector in the projector along a power line that provides operating voltage to the ballast through a power line circuit;

aligning a lamp so that a ballast connector associated with the lamp aligns with the ballast connector disposed in the projector and an interlock connector associated with the lamp aligns with the interlock connector disposed in the projector;

inserting the lamp in the projector a first distance to engage the ballast connectors; and continuing inserting the lamp past the first distance to engage the interlock connectors;

wherein engagement of the interlock connectors completes the power line circuit to apply operating voltage to the ballast.

6. The method of claim 5 further comprising:

removing the lamp from the projector to the first distance to disengage the interlock connectors and break the power line circuit so that operating voltage is removed from the ballast; and removing the lamp from the projector to disengage the ballast connectors;

wherein the ballast connectors remain unexposed through removal of the lamp to at least the first distance.

7. The method of claim 6 wherein the lamp, the ballast connector associated with the lamp and the interlock connector associated with the lamp are each integrated in a lamp housing.

8. The method of claim 7 further comprising:

forming the lamp housing to fit in a projector cavity along an insertion axis only if the ballast connectors and interlock connectors align.

9. A projector comprising:

a housing having a cavity sized to accept a lamp housing having a lamp;

plural processing components disposed in the housing and operable to process visual information to form an image;

a power supply disposed in the housing and operable to provide power to the processing components;

a ballast disposed in the housing and having a connector operable to connect to the lamp housing, the ballast operable to provide operating voltage to the lamp through the connector;

a ballast circuit interfacing the power supply and the ballast, the ballast circuit operable to provide operating voltage to the ballast; and an interlock disposed in the ballast circuit, the interlock breaking the ballast circuit unless a lamp interlock connector is engaged, the lamp interlock connector engaging the interlock only if the ballast lamp connector engages the lamp.

10. The projector of claim 9 wherein the housing cavity is formed to accept insertion of the lamp housing only if the interlock aligns with the interlock connector.

11. The projector of claim 9 further comprising:

a lamp assembly having a housing, a ballast connector and an interlock connector, the ballast connector and interlock connector disposed on the housing so that during insertion of the lamp assembly into the housing cavity the ballast connector engages the ballast before the interlock connector engages the interlock.

12. The projector of claim 9 further comprising:

a lamp assembly having a housing, a ballast connector and an interlock connector, the ballast connector and interlock connector disposed on the lamp housing so that during removal of the lamp assembly from the housing cavity the interlock connector disengages from the interlock before the ballast connector disengages from the ballast.

* * * * *